United States Patent [19]

Patten et al.

[11] 4,038,808
[45] Aug. 2, 1977

[54] TOBACCO HARVESTER

[75] Inventors: Frank C. Patten; John G. Alphin, both of Florence, S.C.

[73] Assignee: Clemson University, Clemson, S.C.

[21] Appl. No.: 622,906

[22] Filed: Oct. 16, 1975

[51] Int. Cl.² .................................................. A01D 45/16
[52] U.S. Cl. ..................................................... 56/27.5
[58] Field of Search ............................ 56/27.5, 341, 1

[56] References Cited
U.S. PATENT DOCUMENTS

| | | | |
|---|---|---|---|
| 3,680,296 | 8/1972 | Beebout | 56/341 |
| 3,695,014 | 10/1972 | Alphin et al. | 56/27.5 |
| 3,946,542 | 3/1976 | Long | 56/1 |

Primary Examiner—Russell R. Kinsey
Attorney, Agent, or Firm—Wellington M. Manning, Jr.

[57] ABSTRACT

A tobacco harvester is disclosed that utilizes an endless defoliator belt having defoliating apertures therein. Tobacco stalks pass into the apertures and during a downwardly moving segment of the defoliator belt leaves are stripped therefrom. A front downwardly inclined portion of the defoliator means includes a first angular section and a second angular section where the angle of the second section with respect to horizontal is greater than that of the first. Using this arrangement the plant is better prepared for defoliation in the first section while normal defoliation takes place in the second section. Further improvements to the tobacco harvester are included such as horizontal and vertical sensors for proper positioning of the defoliating means. Attendant indicator means alert an operator of the need for any necessary adjustment to the defoliator means. Additionally, a stalk collector bin may be provided within the defoliator means and improvements may be made to the defoliator means by way of structure so as to improve the aperture definition around same.

27 Claims, 14 Drawing Figures

TOBACCO HARVESTER

BACKGROUND OF THE INVENTION

A tobacco harvester using a defoliating belt has been previously known as illustrated in the Alphin et al. U.S. Pat. No. 3,695,014 that issued Oct. 3, 1972. In the Alphin et al. Patent, the defoliator belt assumed a V configuration with a top return track and had a plurality of apertures therein. The defoliator means came into contact with a stalk whereby the stalk passed upwardly through apertures of the defoliator belt, and during the constant downward movement of the belt in a frontal inclined portion, leaves on the tobacco stalk were stripped therefrom. In this fashion, the Alphin et al. tobacco harvester was useful in one-pass harvesting of the tobacco crop where a low profile tobacco was planted. As further explained in the Alphin et al. U.S. Pat. No. 3,695,014, tobacco harvesters of the instant general tye are economical for small as well as large tobacco farmers, thus making the unit particularly desirable.

In using the tobacco harvester of the previously mentioned Alphin et al patent and further the improved embodiments, as particularly described and claimed herein, an operator may make a single pass through a field of tobacco and remove the leaves from the stalks without excessive damage thereto. The separate tobacco leaves are conveyed to a collection bin or the like where the leaves are stored for further processing. This particular scheme of tobacco harvesting finds advantageous use in conjunction with bulk curing operations for the tobacco leaves.

The tobacco harvester of the present invention represents an improvement over the harvester described and claimed in the aforementioned Alphin et al. patent. While the prior art is exemplified by U.S. Pat. No. 2,702,134 to Alphin, Jr.,; U.S. Pat. No. 3,178,873 to Meyer; U.S. Pat. No. 3,179,263 to Walter; U.S. Pat. No. 3,470,882 to Clark; U.S. Pat. No. 3,507,103 to Pickett et al., and U.S. Pat. No. 3,542,038 to Hooper, no known prior art is believed to anticipate or suggest the improved tobacco harvester of the present invention.

SUMMARY OF THE INVENTION

It is an object of the present invention to provide an improved tobacco harvester for one-pass harvesting of a low profile tobacco.

Another object of the present invention is to provide an improved apparatus for passing along a row of free standing plants while serially engaging the plants and stripping the leaves from same.

Yet another object of the present invention is to provide an improved tobacco harvester wherein a defoliating belt following an endless path and having apertures therein follows a generally downwardly inclined front portion which has a plant preparation section and a defoliator section therealong.

Generally speaking, the apparatus of the present invention is utilized to remove leaves from free standing plant stalks and comprises endless defoliating means having a downwardly inclined front portion, said front portion being divided into a first inclined section at a predetermined angle with respect to horizontal and a second inclined portion at a second larger angle with respect to horizontal, said defoliating means having a plurality of longitudinally spaced apart stalk receiving and leaf removing apertures; a mobile frame for supporting said defoliating means; and means for moving said defoliating means so that the horizontal velocity of said apertures across said complete first inclined portion is approximately equal and opposite to the velocity of said mobile frame, the horizontal velocity of said first section being greater than the horizontal velocity of the mobile frame whereby the relative rearward motion tends to stabilize the plant and the second section of said front inclined portion moves at a horizontal velocity less than said first section, apertures in said second section moving downwardly over said stalks and removing leaves therefrom.

More specifically, the apparatus of the present invention is mounted on a framework that may be attached to a tractor or other motive power source for transporting same along rows of tobacco or other free standing stalk plants where the leaves of same will be stripped from the stalk and deposited in a receptacle therefor. In this regard, the framework has a defoliator section mounted thereon. The defoliator section is generally an endless means that follows a triangular path with certain modifications.

The defoliator section has a plurality of apertures extending therearound such that the plant stalks may pass upwardly through respective apertures. As the apertures move downwardly arount the stalk the leaves are stripped therefrom. Leaves at the point of stripping fall onto a leaf conveyor that originates under the frontal downwardly inclined portion of the defoliator means and upon reaching the bottom of the defoliator means extends upwardly immediately adjacent the rear upwardly inclined portion of the defoliator means to cooperate therewith and provide an elevator or conveyor for the individual tobacco leaves. The tobacco leaves are conveyed to a point where they can be deposited onto further conveying means, into a collector bin or the like. Preferably, to better permit efficiency of the defoliator means, means may be provided in conjunction therewith to remove any tobacco leaves that may be entrapped therein. The rearwardly inclined portion of the defoliator means extends substantially beyond the end of the leaf conveyor belt and has the leaf dislodging means associated therewith. A rotary flapper, beater bar or the like, or an air blower means positioned above the edge of the defoliator means may be employed to dislodge any tobacco leaves that may be entrapped within the defoliator means.

In using the improved tobacco harvester system of the present invention, the operator of the tractor may or may not be skilled in proper guidance of the tractor along the row of tobacco to properly present the defoliation system to the row of stalks. In a preferred arrangement of the present invention, vertical and horizontal sensors are provided to sense placement of the defoliator section with respect to the row and stalks. Proper position of the defoliator means can thus be determined for suitable defoliation of the tobacco plants. Adjustments that are made as a result of actuation of the sensors are not as a general rule, automatic. Instead, an indicator is provided which permits visual observation so that the operator can make the necessary adjustments to move the defoliator means to the left or to the right or up or down as required. Furthermore, while visual indicators such as lights are certainly suitable, (illustrated as arrows) to indicate the desired correction, an audible signal such as a horn, buzzer or the like may be used in lieu of or in conjunction with the visual signal. An operator is thus not required to constantly watch the signal panel. Instead, upon receiving an audible signal from the horn, the operator can visually determine the necessary adjustments and then make same.

In a further preferred arrangement, a driving connection is provided between the defoliator means and the conveyor means such that the relative speeds between same remain constant. Likewise, it is desirable to utilize an off-on clutch arrangement for the defoliator means of the present invention. As such, a variable pitch sheave or other arrangement may be provided with an off-on clutch system.

DESCRIPTION OF THE PREFERRED EMBODIMENTS

Figure 1:
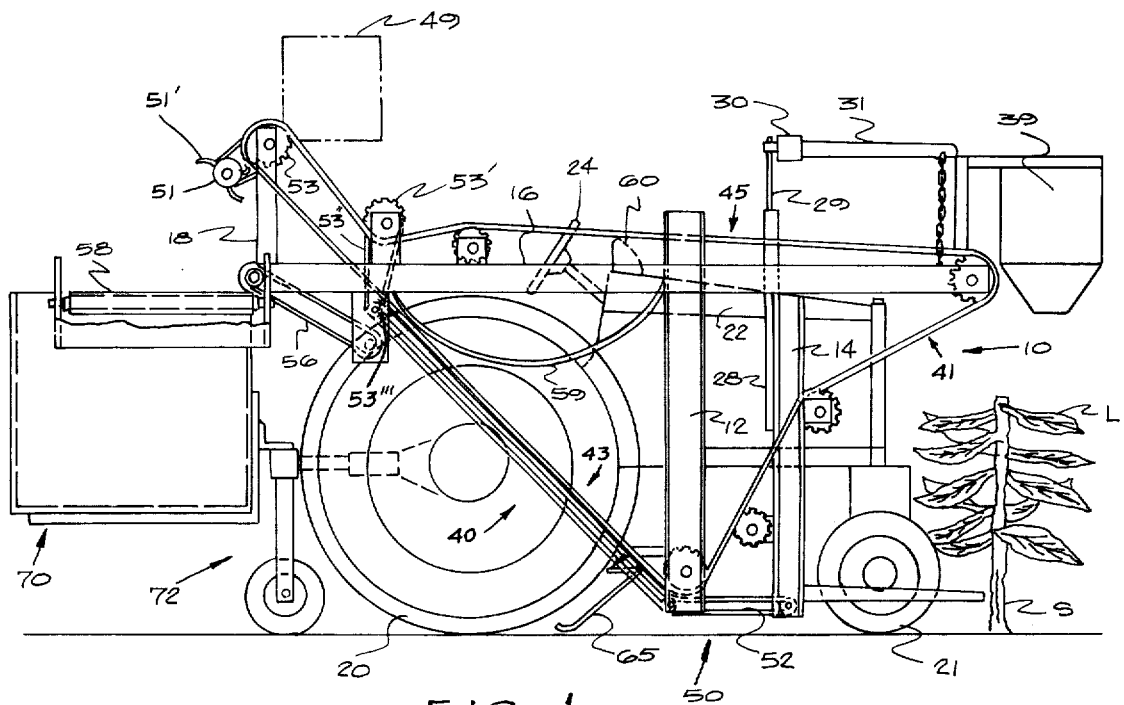
FIG. 1 is a side elevational view of the improved tobacco harvester of the present invention.
Figure 2:
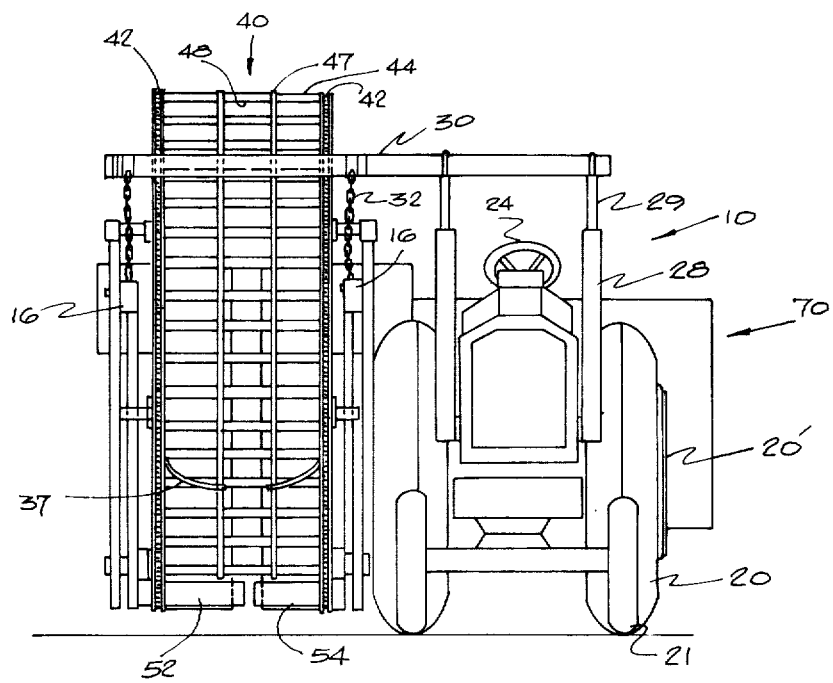
FIG. 2 is a frontal elevational view of the tobacco harvester as shown in FIG. 1.
Figure 3:
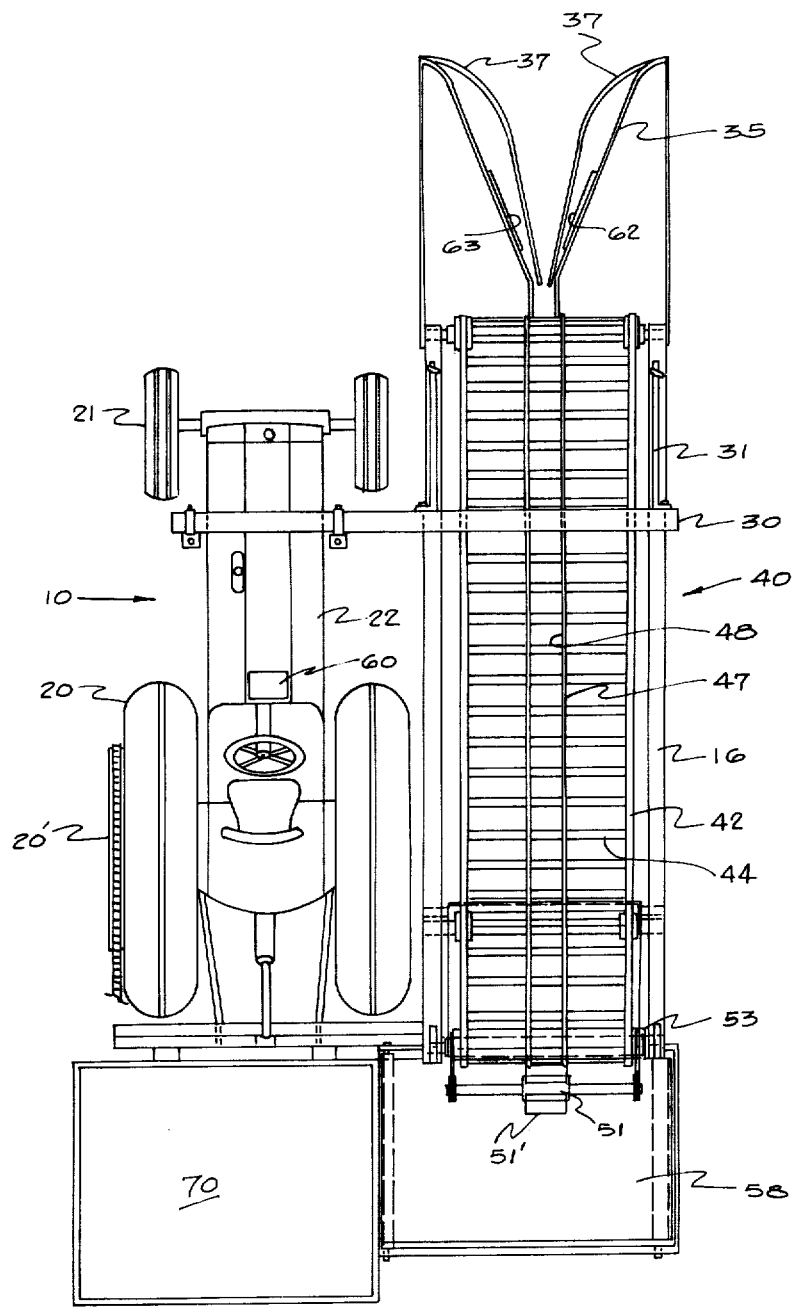
FIG. 3 is a top plan view of the tobacco harvester of FIG. 1.

Making reference to the drawings, the present invention will now be described in detail. In FIGS. 1, 2 and 3 a motive power source such as a tractor is generally indicated as 10. In considering the motive power source, it should be understood that any of a number of tractors or the like could be utilized to afford motive power and support for the tobacco harvester of the present invention. In this regard, the motive power source could also be incorporated into the harvester per se in such fashion that the harvester is a self propelled unit.

Motive power unit 10 has suitably affixed thereto an endless defoliating unit generally indicated as 40 that moves in a closed path along side the tractor unit 10 to receive tobacco stalks S through the apertures therein and, as the defoliator means moves along, in a direction opposite the direction of movement of the tractor, to strip the leaves L from stalk S, such that they are deposited on a leaf transfer means generally indicated as 50 after which the leaves are conveyed to and deposited in a leaf collection bin 70. The general scheme of apparatus immediately described above is coincident with the scope of coverage of the Alphin et al. U.S. Pat. No. 3,695,014 wherein a similar type harvesting apparatus is disclosed and claimed, and which is incorporated herein by reference as definitive of common features with the harvester of the present invention. As will be pointed out hereinafter, however, when making a direct comparison between the present invention and that set forth in the aforementioned Alpin et al patent, differences will be both distinct and noteable.

A plurality of vertical frame members 12, 14 and 18 are united by horizontal members 16 on both sides of the defoliator unit 40. These frame members are suitably secured to tractor 10 and, in turn, have defoliator unit 40 secured thereto. The defoliator means generally indicated as 40 may be constructed of a pair of drive chains 42 having a plurality of horizontal members 44 secured therebetween. In the embodiment shown in FIG. 2, horizontal members 44 have a pair of longitudinal members 47 extending thereacross so as to define apertures 48 therebetween. As will be pointed out hereinafter, formation of apertures 48 may be by a plurality of means according to the teachings of the present invention and in fact in certain arrangements only horizontal members 44 are employed with apertures 48 extending across the width of the defoliator belt. Drive chains 42 pass around a plurality of pulleys to define the closed path of the defoliating apertures as will be described in detail hereinafter.

The tractor generally indicated as 10 has a large rear wheels 20, small front wheels 21, longitudinal frames 22 and a steering apparatus 24 that is utilized by the operator so as to properly guide the tractor. The tractor is provided with a front hydraulic lift including transversely spaced vertical hydraulic cylinders 28 containing pistons (not shown) and piston rods 29 secured at their upper ends to a transverse beam 30, which is a principal support for the defoliating unit generally indicated as 40. Beam 30 has forward extension 31 with chains 32 depending therefrom and secured at their lower ends to the defoliator frame members 16. A further horizontal beam at the rear of the tractor supports the rear of the frame and is not shown. In this regard, as mentioned above, the Alphin et al. U.S. Pat. No. 3,695,014, is incorporated by reference herein as showing many of the general features of the harvesting unit of the present invention.

A key feature to the harvester of the present invention is the defoliator means generally indicated as 40. Making additional reference to FIGS. 10 through 13, the defoliator means generally indicated as 40 is divided into three sections, a front downwardly inclined portion 41, a rear upwardly inclined portion 43 and a top return portion 45. Along front downwardly inclined portion 41 is a first section A-B that makes initial contact with the leaves L of a tobacco plant P. Section A-B is presented at a particular angle with respect to horizontal, preferably in the range of 15°-45°. A second frontal section located between points B and C is presented at a greater angle with respect to horizontal than first section A-B. At point B, the stalk has begun ingress to the inside of a defoliator unit and further leaf engagement continues. General leaf removal by the defoliator unit occurs between points B and C, though some leaf removal may occur at any point along the front section 41. While two sections are disclosed, i.e., A-B and B-C for front portion 41 of the defoliating unit, obviously other incremental sections could also be utilized at the same or different angles. In presenting the particular arrangement as shown in FIGS. 10 to 13 as opposed to the straight frontal incline as disclosed in the Alphin et al. U.S. Pat. No. 3,695,014, several improved features are noteworthy. First, in section A-B at the smaller angle, the horizontal dimension of the defoliating apertures is greater than with a greater angle. Moreover, there is less plant engagement prior to the stalk passing into the apertures, again due to the flatter angle. Thirdly, as opposed to a constant movement as discussed in the prior patent, with the arrangement in FIGS. 10 to 13, there is a relative rearward movement with respect to the tobacco plant since the horizontal velocity of the defoliator unit at section A-B is greater than the forward horizontal velocity of the tractor. There is thus a slight rearward pressure on the top of the plant which better stabilizes the plant for defoliation. Also an air blower means 39 (see FIG. 1) may be secured to the frame and be directed onto the tobacco leaves just ahead of defoliator unit 40 to assist in preparing the plant for defoliation.

In section B-C, a greater angle with respect to horizontal is presented whereby smaller horizontal aperture dimensions are presented. The horizontal velocity of the defoliator unit, however, approximates the forward horizontal velocity of the tractor. Relative movement of the apertures is thus almost vertical, around stalks S, whereby the leaves L are stripped therefrom.

Figure 10:
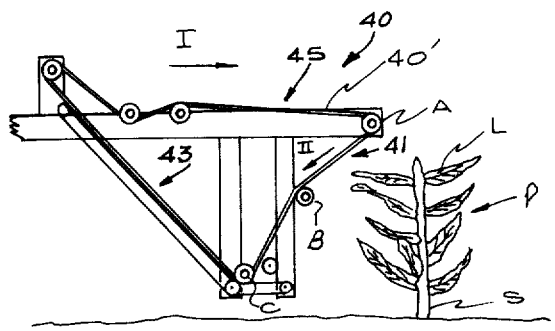
FIGS. 10 through 13 show progressive defoliation of a tobacco plant using the defoliator unit of the present invention.
Figure 11:
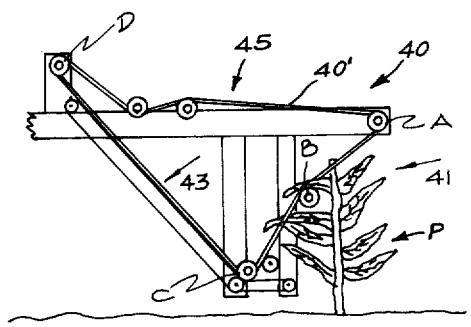
Figure 12:
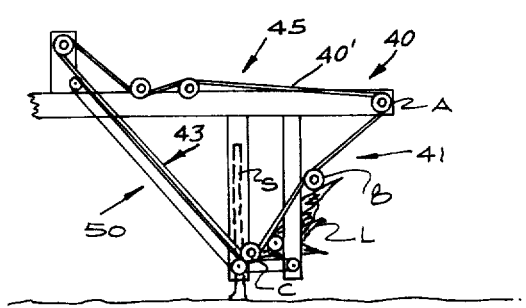
Figure 13:
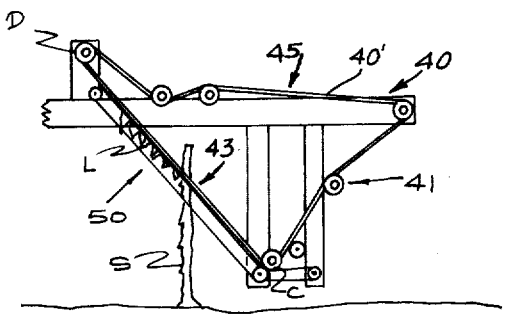

Referring specifically to FIGS. 10 through 13, note in FIG. 10 the defoliator unit 40 as schematically illustrated, would be moved in the direction of the arrow I by a motive power source (not shown). Simultaneously therewith, defoliator belt 40' of the defoliator unit 40 moves in the direction of the arrow II along front downardly inclined section 41. In FIG. 11, the plant P and the belt 40' have made initial contact at section A-B of frontal inclined section 41. Relative rearward movement along section A-B causes pressure on the top of leaves L whereby stalk S is stabilized and passes upwardly into the apertures (not shown). Further in FIG. 12, the apertures through which stalk S has passed have moved downwardly in section B-C of frontal inclined section 41 such that the leaves L have been stripped from stalk S and stalk S stands naked within the defoliator means 40. Defoliator means 40 has moved forwardly with respect to stalk S as shown in FIG. 13 such that the stalk S will exit the defoliator means, stripped of leaves, and remain standing in the field. In FIG. 12, it is seen that that leaves L are bunched above the lower part of leaf transport conveyor 50 ready to pass between one of the conveyor belts 52 or 54 (See FIG. 2) and the rear section 43 of defoliator means 40. Leaves L will thus be transported to the leaf container bin 70 (See FIG. 1). Note further, that the length of the defoliator section 43 between C and D is substantially in excess of the length of conveyor means 50. In this fashion, it is much easier to release leaves from the defoliator means 40 which have become entangled therein.

Once the leaves L have been stripped from stalk S by the defoliator means along front leg 41, the leaves fall onto the leaf transport conveyor generally indicated as 50. Leaf transport conveyor 50 is made up of a pair of side by side belt conveyors 52 and 54 (See FIGS. 1 and 2) that extend forwardly beyond the bottom of defoliator means 40 and upwardly along the rear section 43 of same for a portion of the length of section 43 only. Space remaining between conveyor belts 52 and 54 permits passage of the tobacco stalk therebetween. Note, as mentioned above, that rear inclined section 43 of defoliator means 40 extends appreciably beyond the end of the leaf conveyor 50 as better shown in FIG. 1 to enable more efficient removal of leaves L from the defoliator belt 40'. In this regard, note in FIG. 11 that a rotating element 51 is located adjacent an end of inclined section 43 of defoliator means 40 and has a plurality of beaters 51 secured thereto. Beaters 51 rotate against defoliator belt 40' so as to dislodge any leaves that are entrapped therein. Note also above the rear end of rear defoliator section 43, an air blower 49 that is schematically illustrated in phantom. Air blower 49 could be utilized separately or in conjunction with the rotating element 51 so as to dislodge entrapped leaves L from the defoliator belt 40' prior initiation of the return course of the defoliator belt. As leaves L thus move upwardly along the rear inclined course 43 of the defoliator means 40, the leaves are held on one side by conveyor belts 52 or 54 and on an opposite side by the defoliator belt 40'. At the terminal end of belts 52 and 54, the leaves drop onto a further conveyor 56 that likewise transports the leaves, along to a further, transverse conveyor 58 which deposits the leaves into the leaf container generally indicated as 70. Hence, once leaves L are stripped from a stalk S, they are conveyed along the leaf conveyor system generally indicated as 50 to the point where they are deposited into a leaf receptacle or container 70 that is provided therefor. As illustrated, leaf container 70 is supported by the tractor 10 by suitable rolling framework generally indicated as 72. Leaf container 70 could be an independent vehicle that is towed by tractor 10.

On occasion, a stalk S, leaves L, or other debris may pass through defoliator belt 40' and reside on the inside of the closed path of defoliator unit 40. Such materials if left unattended would continue to collect within the defoliator unit unit a malfunction was caused thereby. As such, a stalk collection bin 59 may be provided within the defoliator unit 40 (See FIG. 1) whereby any debris that might move upwardly along rear defoliator section 43 could fall into bin 59 adjacent the top of section 43 and be removed as a potential cause of mechanical problems. Stalk collection bin 59 may be suitably secured to the general harvester framework.

Figure 4:
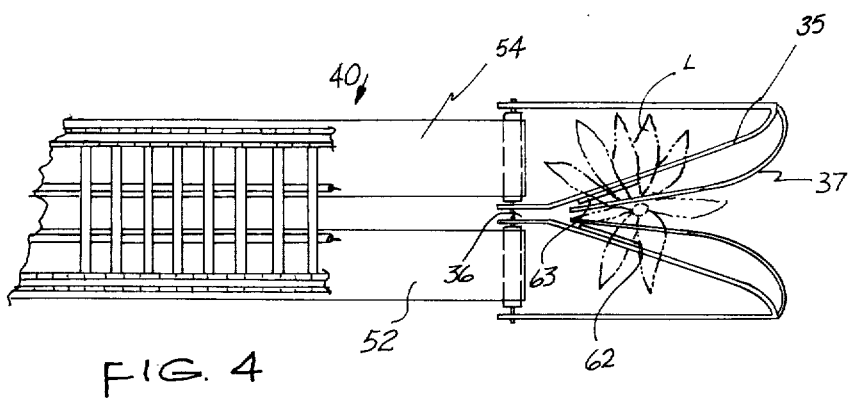
FIG. 4 is a partial top plan view of the defoliator unit of the tobacco harvester of the present invention illustrating horizontal sensors therefrom.
Figure 5:
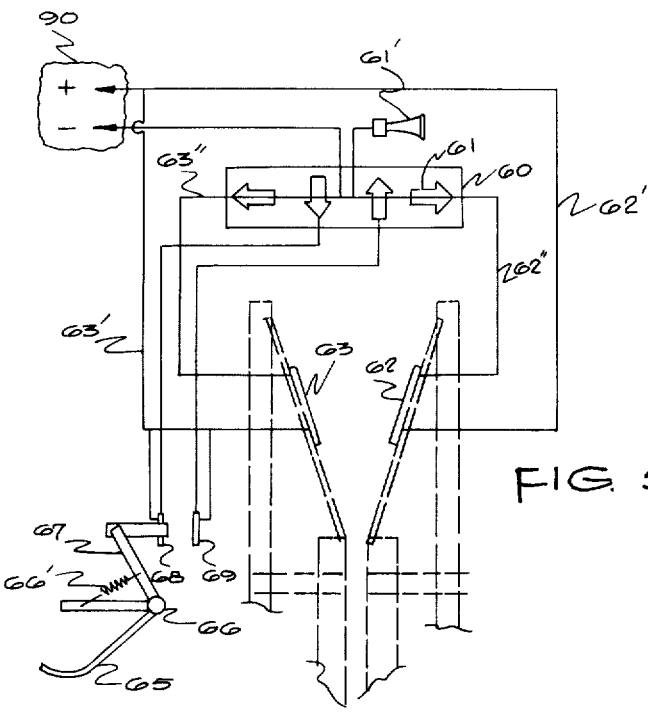
FIG. 5 is a schematic of the electrical connection for horizontal and vertical sensors for the tobacco harvester of the present invention.

Making specific reference to FIGS. 4 and 5, sensing apparatus will be described with respect to the present invention. In FIG. 4, a top view of a portion of the defoliator means 40 is illustrated above the forward portions of leaf conveyor belts 52 and 54. Positioned in front of conveyor belts 52 and 54 are a pair of stationary guides 35. Guides 35 define a throat 36 through which a stalk S will pass to be defoliated by the harvester of the present invention. Located immediately in front of throat 36 are a pair of electrical contact plates 62 and 63 which determine the proper lateral position of the defoliator unit 40 with respect to the tobacco plant to enable the operator to make adjustments if necessary to properly align the unit with the particular row of tobacco plants. FIG. 5 illustrates a panel indicator 60 provided having a plurality of lights in the form of arrows 61 or other indicia thereon. Electrical contact 62 as illustrated in FIG. 5 is connected to the tractor power supply 90 by way of conductor 62' and to the indicator panel 60 through conductor 62". Likewise, contact 63 is associated with the indicator panel 60 through a contact 63" while being connected to power supply 90 through a connector 63'. These sensors determine the proper horizontal or lateral position of the defoliator unit 40 with respect to the row of tobacco plants. Should a plant, for example, engage electrical contact 62, the defoliator unit 40 is off line to the left. As such, engagement with contact 62 causes exitation of the arrow pointing to the right on the indicator panel to enable the operator to know to make appropriate right hand correction. Conversely, engagement between a plant and contact plate 63 will produce exitation of the arrow pointing to the left on panel 60 and again will cause the operator to make the appropriate adjustment. A pair of stalk straightening rods or the like 37 are also located in front of defoliator unit 40 and are located upwardly along guides 35 and curve inwardly towards throat 36. Rods 37 will engage a tobacco plant P that may be leaning to one side and will straighten plant P to cause same to feed properly into throat 36 until it can be engaged by the defoliator unit 40 and the leaves properly removed therefrom.

Referring to FIGS. 1 and 5, vertical sensing of the defoliating unit is accomplished by a curved sensor element 65 that extends from a pivot rod 66 to which is also fastened a switch 67 which is spring loaded by a spring 66' and engages one or more of a pair of contacts 68 and 69 to signal an improper vertical location of the defoliator unit 40. As illustrated in FIG. 5, engagement between switch 67 and contact 68 closes the electrical circuit at 68 whereby the arrow pointing down remains unexcited. In the event that the ground contact sensor element 65 moves downwardly indicating a greater distance between the bottom of the defoliator unit 40 and the ground, switch 67 will pivot to the left away from contact 68 whereby contact 68 is open and the down indicating arrow becomes excited to indicate that the defoliator unit 40 needs to be moved downwardly. The operator could then make appropriate hydraulic correction as defined in the Alphin et al. U.S. Pat. No. 3,695,014 to lower defoliator unit 40 until the down light ceases to show, which indicates reclosing of contact 68 with switch 67. Should ground contact sensor 65 pivot upwardly, element 67 passes across contact 68 and makes further engagement with contact 69. Closing of contact 69 indicates that there is too little space between the ground and the defoliator unit 40 or that the defoliator unit may even, in fact, be touching the ground. The upwardly pointing arrow becomes excited upon closing of contact 69 and indicates to the operator that the defoliator unit 40 should be moved upwardly.

Panel 60 is most preferably also provided with an audible signal such as a horn schematically indicated as 61'. Horn 61' would be actuated at the time any lateral or vertical correction is necessary. In this fashion, the operator need not maintain a constant surveilance of indicator panel 60, but may direct further attention to the overall harvesting operation. Should correction be necessary, the horn 61' would emit sound, and the operator could then look at the panel, determine which particular corrective action is necessary, and take steps to make the corrective action.

Referring to FIGS. 2 and 3, it can be seen that tractor tire 20 on the left rear has a sprocket 20' secured thereto. A chain passing over sprocket 20' extends rearwardly to a drive mechanism, conventional in nature and thus not shown, which affords a driving motion to sprocket 53 that is located at the top of the defoliator unit 40. A further sprocket 53' that is located along the return path of the defoliator chain 42 and is located on the outside of same, rotates in an opposite direction, is united by virtue of a belt 43'' to a drive pulley 53''' which imparts a driving motion to leaf conveyors 52 and 54. The relative speeds of conveyors 52 and 54 and chain 42 of defoliator unit 40 are thus constant.

Figure 14:
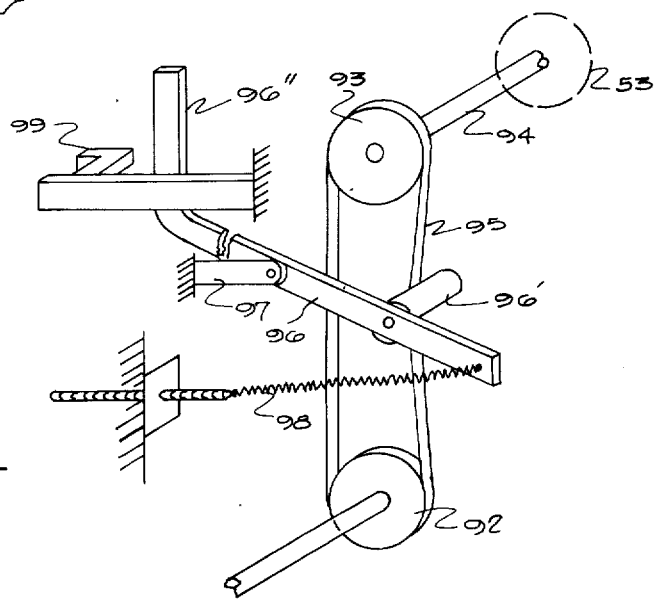
FIG. 14 illustrates a portion of a variable speed drive-clutch arrangement for the defoliator unit of the present invention.

FIG. 14 illustrates a further unit that may be employed according to one embodiment of the present invention. A variable speed drive may thus be supplied for defoliator unit 40 as well as an off-on clutch system. A pulley 92 from the main drive system from the left rear tractor tire 20 has a variable pitch as does a further pulley 93 that is secured on a shaft 94 which receives drive sprocket 53 for defoliator unit 40 on an opposite end thereof. A drive belt 95 is received around pulleys 92 and 93 and under normal circumstances, imparts driving motion from the main drive pulley 92 to the defoliator drive pulley 93. An actuator lever 96 is pivotally secured at 97 to a portion of the harvester frame, and has an idler roll 96' secured at an end thereof. Idler roll 96' of lever 96 is under spring tension against belt 95 in a driving arrangement, being held by a suitable spring 98 that is secured at one end to lever 96 and at an opposite end to the harvester frame. A latch 99 is further provided adjacent an upper curved end 96'' of lever 96 to secure lever 96 in an off position when desired. Thus, when lever 96 is located adjacent the operator's seat, upper end 96'' of lever 96 could be held at latch 99 whereby idler 96' is held out of contact with belt 95. In this arrangement, no driving connection is afforded the defoliator unit, and the defoliator unit and conveyor units remain idle. Conversely, once lever 96 is disengaged from latch 99 and pivoted downwardly, idler 96' forces belt 95 into a driving arrangement with the pulleys 92 and 93. Depending upon the depth of penetration of belt 95 into the pitch of the pulleys 92 and 93, the driving speed of the defoliator unit may be varied.

Figure 6:
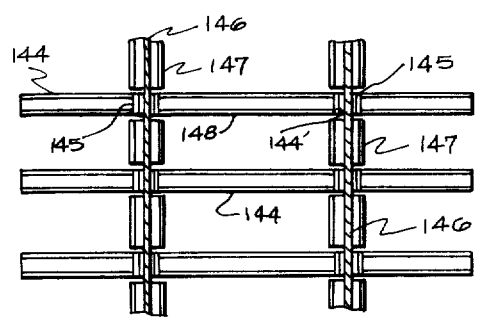
FIGS. 6 through 9 are further embodiments of the defoliator belt according to the present invention.
Figure 7:
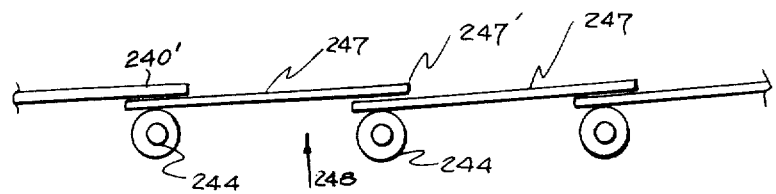

FIGS. 6 through 9 illustrate further specific embodiments of the defoliator chain 40' of the present invention as to means for defining the defoliating apertures therein. FIG. 6 shows a plurality of horizontal members 144 that are secured at opposite ends to drive chains as indicated in FIGS. 1, 2 and 3. Each horizontal member 144 has a pair of openings 144' into which are pressed bushings 145. A cable 146 passes through the bushings 145 located in the horizontal members 144 along the length of the defoliator unit. Spaced between each horizontal member 144 is a separate longitudinal member 147 which in a proper adjustment loosely abuts horizontal members 144 at opposite ends thereof. These separate longitudinal members 147 thus cooperate with horizontal members 144 to define defoliating apertures 148 therebetween through which the plant stalk passes while the leaves are being stripped therefrom according to techniques described herein. In FIG. 7, horizontal members 244 are each provided with longitudinal members 247 secured thereto at one end only with members 247 extending outwardly beyond the next adjacent horizontal member 244. In this fashion, longitudinal members 247 overlap each other to a point beyond the next adjacent horizontal member 244 to define the apertures 248 therebetween. Furthermore, during passage along the tortuous path of the defoliator unit 40, free ends 247' of longitudinal members 247, flap about freely and thus do not create any tension in defoliator belt 240'.

Figure 8:
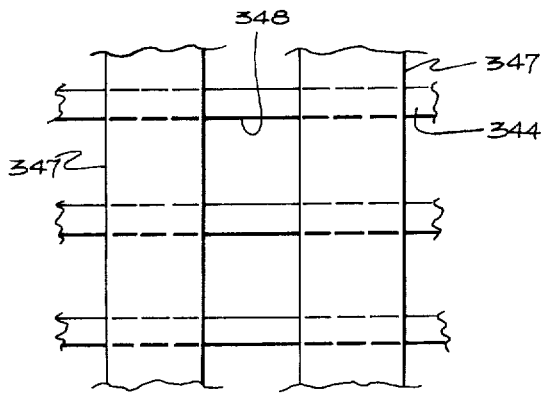
Figure 9:
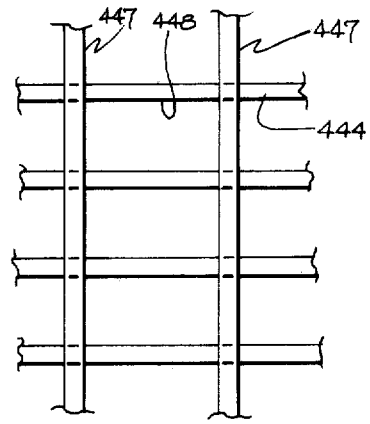

In FIG. 8, the horizontal members 344 are illustrated having a pair of longitudinal belts 347 passing along the outer surfaces thereof. Longitudinal belts 347 cooperate with horizontal members 344 to define defoliating apertures 348 therebetween. This particular arrangement thus embodies separate belts 347 that merely extend and are properly positioned around the defoliator entire unit. Conversely, in FIG. 9, horizontal members 444 receive longitudinal members 447 on the inside thereof so as to define apertures 448. Generally speaking, in this arrangement, the closed path of longitudinal members 447 would not necessarily extend completely around the closed path of the defoliator unit 40, but would only be necessary adjacent the front incline section of the defoliator unit to define the defoliating apertures 448 thereat.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. Apparatus for removing leaves from free standing plant stalks comprising:
    a. endless defoliating means having a downward inclined front portion, said front portion being divided into at least a first inclined section at a predetermined angle with respect to horizontal and a second inclined portion at a second, larger angle with respect to horizontal, said defoliating means having a plurality of longitudinally spaced apart stalk-receiving and leaf-removing apertures;
    b. a mobile frame for supporting said defoliating means; and
    c. means for moving said defoliating means so that horizontal velocity of said apertures across said complete first inclined portion is approximately equal and opposite to the velocity of said mobile frame, the horizontal velocity of said first section being greater than the horizontal velocity of said mobile frame whereby relative rearward motion tends to stabilize the plant and the second section of said first inclined portion moves at a horizontal velocity less than said first section, apertures in said second section moving downwardly over said stalks and removing leaves therefrom.

2. Apparatus as defined in claim 1 wherein air blower means are located adjacent said front inclined portion of said defoliating means, said blower means being directed onto the top of said stalks entering said defoliating means 3. Apparatus as defined in claim 1 wherein said defoliator means has an upwardly inclined portion subsequent to said front portion and wherein a leaf transport means is located adjacent said upwardly inclined portion of said defoliator means, and extends therealong a distance less than the length of said upwardly inclined portion.

4. Apparatus as defined in claim 3 wherein said defoliator means and said leaf transport means are drivingly connected for constant relative speeds therebetween.

5. Apparatus as defined in claim 3 wherein leaf dislodging means are located adjacent an upper end of said upwardly inclined portion of said defoliator means to assist in removing leaves from said defoliator that have become entrapped therein.

6. Apparatus as defined in claim 3 wherein a collector means is positioned within said defoliator means adjacent said upwardly inclined portion thereof, said collector means receiving stalks, leaves and trash that pass into the inside of said defoliator means.

7. Apparatus as defined in claim 1 wherein variable speed drive means are provided for said defoliator means.

8. Apparatus as defined in claim 1 wherein clutch means are operatively associated with said defoliator means for rendering said defoliator means operational and unoperational as desired.

9. Apparatus as defined in claim 1 further comprising guide means adjacent a front end of said defoliator means, said guide means directing said stalks into proper contact with said defoliator means.

10. Apparatus as defined in claim 1 further comprising sensing means associated with said defoliator means for determining horizontal and vertical placement of same with respect to stalks to be harvested and signal means associated with said sensing means to indicate any correctional action that may be needed.

11. Apparatus as defined in claim 1 wherein said apertures are defined by a plurality of spaced apart horizontal members and a pair of endless longitudinal members following a path across said horizontal members.

12. Apparatus as defined in claim 11 wherein said longitudinal members are a pair of belts residing outside the path of said horizontal members and being in contact therewith.

13. Apparatus as defined in claim 11 wherein said longitudinal members reside inside the path formed by said horizontal members.

14. Apparatus as defined in claim 1 wherein said apertures are defined by a plurality of spaced apart horizontal members, and a pair of longitudinal members secured at one end only to each of said horizontal members and extending outwardly beyond a next adjacent horizontal member.

15. Apparatus for removing leaves from free standing plant stalks comprising:
    a. a frame;
    b. an endless defoliator means secured to said frame and following a path therearound, said defoliator means having a plurality of apertures therealong, said path having a front generally downwardly inclined portion for receiving stalks in said apertures and removing leaves therefrom, and a second upwardly inclined portion, said front downwardly inclined portion comprising a first stalk preparation section at a predetermined angle in the range of 15° to 45° with respect to horizontal and a second defoliator section at a greater angle with respect to horizontal;
    c. leaf conveyor means originating beneath said front downwardly inclined portion of said defoliator means and following said second upwardly inclined portion of said defoliator means in close proximity thereto and cooperating with said defoliator means to convey leaves upwardly therebetween, said conveyor means terminating intermediate the length of said second portion of said defoliator means;
    d. common drive means for said defoliator means and said leaf conveyor; and
    e. leaf collection means associated with said leaf conveyor means.

16. Apparatus as defined in claim 15 wherein said defoliator means comprises a plurality of spaced apart, horizontal members and a pair of longitudinal members passing across said horizontal members, said horizontal and longitudinal members cooperating to define defoliating apertures.

17. Apparatus as defined in claim 15 wherein said defoliating means comprises a plurality of spaced apart, horizontal members, each horizontal member having a pair of flexible longitudinal members secured thereto only and extending beyond a next adjacent horizontal member.

18. Apparatus as defined in claim 15 wherein air blower means are located adjacent said defoliator means to better prepare plants for defoliation.

19. Apparatus as defined in claim 15 wherein positional sensing means are associated with said defoliator means and indicator means are operatively associated with said sensing means to indicate any needed correction at the position of the defoliator means to the plants to be harvested.

20. Apparatus as defined in claim 19 wherein said sensing means include means to sense horizontal and vertical positioning.

21. Apparatus as defined in claim 15 wherein said defoliator means and said leaf conveyor means are operatively drivingly associated, thus producing constant relative speeds therebetween.

22. Apparatus as defined in claim 15 wherein an off-on clutch means is operatively associated with said defoliator means.

23. Apparatus as defined in claim 15 wherein a stalk collection bin is provided within said defoliator means.

24. Tobacco harvester apparatus comprising:
   a. a frame;
   b. an endless defoliator means secured to said frame and being moveable in a path therearound, said defoliator means path having a front downwardly inclined portion, a rear upwardly inclined portion and a third return portion therebetween, said front portion having a first section inclined downwardly at a predetermined angle with respect to horizontal and a second section inclined downwardly at a greater predetermined angle with respect to horizontal through said first section, said defoliator means comprising a plurality of spaced apart horizontal members secured together at opposite ends; and
   c. means to receive leaves from said defoliator means.

25. Tobacco harvester apparatus as defined in claim 24 wherein said spaced apart horizontal members have longitudinal members thereacross, said horizontal and longitudinal members forming defoliating apertures therebetween.

26. Tobacco harvester apparatus as defined in claim 24 wherein said means to receive leaves from said defoliator means comprises a conveyor that is located closely adjacent said rear upwardly inclined portion of said defoliator means and a leaf collection bin adjacent an end of said conveyor means.

27. Tobacco harvester apparatus as defined in claim 24 further comprising a motive power source to which said frame is connected.

* * * * *